United States Patent
Sauer et al.

(10) Patent No.: US 12,140,935 B2
(45) Date of Patent: Nov. 12, 2024

(54) DEVICE AND METHOD FOR SETTING UP AND/OR PROVIDING A WORKING ENVIRONMENT

(71) Applicant: Siemens Aktiengesellschaft, Munich (DE)

(72) Inventors: Markus Sauer, Munich (DE); Florian Zeiger, Höhenkirchen-Siegertsbrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 721 days.

(21) Appl. No.: 17/251,703

(22) PCT Filed: May 24, 2019

(86) PCT No.: PCT/EP2019/063485
§ 371 (c)(1),
(2) Date: Dec. 11, 2020

(87) PCT Pub. No.: WO2019/238390
PCT Pub. Date: Dec. 19, 2019

(65) Prior Publication Data
US 2021/0278823 A1    Sep. 9, 2021

(30) Foreign Application Priority Data

Jun. 14, 2018   (EP) .................................. 18177654

(51) Int. Cl.
*G05B 19/41*   (2006.01)
*G05B 19/418*   (2006.01)
(Continued)

(52) U.S. Cl.
CPC ......... *G05B 19/4188* (2013.01); *G06F 16/27* (2019.01); *G06F 21/10* (2013.01);
(Continued)

(58) Field of Classification Search
CPC ...... G05B 19/4188; G05B 2219/31001; G06F 16/27; G06F 21/64; G06F 21/10;
(Continued)

(56) References Cited

U.S. PATENT DOCUMENTS

2006/0227810 A1   10/2006   Childress et al. ............ 370/477
2013/0007845 A1   1/2013    Chang et al. .................. 726/4
(Continued)

FOREIGN PATENT DOCUMENTS

| CN | 101156138 A | 4/2008 | ............... G06F 9/50 |
| CN | 103563294 A | 2/2014 | ............. H04L 12/24 |

(Continued)

OTHER PUBLICATIONS

Search Report for International Application No. PCT/EP2018/081955, 13 pages, Sep. 11, 2019.
(Continued)

*Primary Examiner* — Christopher W Carter
(74) *Attorney, Agent, or Firm* — Slayden Grubert Beard PLLC

(57) ABSTRACT

Various embodiments include a control device for setting up and/or providing a working environment with at least one performance unit to perform at least one factory task by means of machines comprising: a resource management unit programmed to request resources necessary for the working environment; and a comparison unit programmed to compare the requested resources with at least one resource agreed upon in a binding agreement stored in a distributed database and to approve the requested resource in dependence on the comparison result. The control device is programmed to set up and/or provide the working environment with at least one compared and approved resource. The at least one performance unit is programmed to coordinate (Continued)

the checking for complete factory task performance by one or more units involved in the working environment.

10 Claims, 2 Drawing Sheets

(51) Int. Cl.
    *G06F 16/27*      (2019.01)
    *G06F 21/10*      (2013.01)
    *G06Q 10/0631*      (2023.01)
    *G06Q 10/10*      (2023.01)

(52) U.S. Cl.
    CPC . *G06Q 10/06313* (2013.01); *G06Q 10/06315* (2013.01); *G06Q 10/103* (2013.01); *G05B 2219/31001* (2013.01); *G06Q 2220/00* (2013.01)

(58) Field of Classification Search
    CPC ....... G06Q 10/06313; G06Q 10/06315; G06Q 10/103; G06Q 2220/00; H04L 9/50; H04L 67/12; H04L 63/00; H04W 4/70
    See application file for complete search history.

(56) References Cited

U.S. PATENT DOCUMENTS

| | | | | |
|---|---|---|---|---|
| 2013/0042004 | A1 | 2/2013 | Boss et al. | 709/226 |
| 2013/0211555 | A1* | 8/2013 | Lawson | G06F 9/5072 |
| | | | | 700/28 |
| 2014/0047107 | A1* | 2/2014 | Maturana | G05B 19/056 |
| | | | | 709/224 |
| 2014/0337429 | A1* | 11/2014 | Asenjo | H04L 67/10 |
| | | | | 709/204 |
| 2016/0358143 | A1 | 12/2016 | Foti | G06Q 20/14 |
| 2017/0078723 | A1 | 3/2017 | Rao et al. | 725/31 |
| 2018/0225611 | A1* | 8/2018 | Daniel | G06Q 10/06315 |
| 2019/0119664 | A1 | 4/2019 | Inui | C12N 9/88 |
| 2019/0268284 | A1 | 8/2019 | Karame et al. | |
| 2019/0339668 | A1* | 11/2019 | Biernat | H04L 9/3239 |
| 2019/0340269 | A1* | 11/2019 | Biernat | H04L 9/50 |
| 2021/0055718 | A1* | 2/2021 | Rathgeb | H04L 9/3239 |
| 2021/0132582 | A1* | 5/2021 | Biernat | G05B 19/4093 |

FOREIGN PATENT DOCUMENTS

| | | | |
|---|---|---|---|
| CN | 103858118 A | 6/2014 | G06F 15/16 |
| CN | 107832139 A | 3/2018 | G06F 21/62 |
| WO | 2017 021155 | 2/2017 | G06Q 20/36 |
| WO | 2017 078723 | 5/2017 | H04L 12/24 |
| WO | 2017 169399 | 10/2017 | C12N 1/21 |
| WO | 2018/019364 A1 | 2/2018 | G06F 21/60 |
| WO | 2019 063327 | 4/2019 | H04L 29/06 |
| WO | 2019 224001 | 11/2019 | G06F 21/64 |

OTHER PUBLICATIONS

Sharma Pradip Kumar et al: "A Software Defined Fog Node Based Distributed Blockchain Cloud Architecture for IoT", IEEE Access, vol. 6, pp. 115-124, XP055594529, USA, ISSN: 2169-3536, DOI: 10.1109/ACCESS.2017.2757955, summary, sections I and II, 2017.
Chinese Office Action, Application No. 201980039645.7, 17 pages, Jan. 12, 2024.

* cited by examiner

DEVICE AND METHOD FOR SETTING UP AND/OR PROVIDING A WORKING ENVIRONMENT

CROSS-REFERENCE TO RELATED APPLICATIONS

This application is a U.S. National Stage Application of International Application No. PCT/EP2019/063485 filed May 24, 2019, which designates the United States of America, and claims priority to EP application Ser. No. 18/177,654.3 filed Jun. 14, 2018, the contents of which are hereby incorporated by reference in their entirety.

TECHNICAL FIELD

The present disclosure relates working environments. Various embodiments may include device and/or methods for setting up and/or providing a working environment, e.g., in a machine economy environment.

BACKGROUND

A need exists to protect products, for example devices (e.g. control devices, Internet of Things (IoT) devices), device components or software components, but also machines, machine tools or robots or robot-controlled components, with IT security mechanisms against manipulation and/or reverse engineering. Cryptographic IT security mechanisms are already in use, for example in smart devices, for example in devices of the Internet of Things (IoT), of cyber-physical systems, of energy technology automation systems or of manufacturing systems, of operational technology or of other installations.

In the present description, the expression "protected against manipulation" extends beyond the term "security". Not only are the aforementioned cryptographic or security methods used here, but data transmission is also reliably secured against attacks or unauthorized external access.

In the context of the present description, the term "security" refers essentially to the security or protection, confidentiality and/or integrity of data and their transmission, and also security, confidentiality and/or integrity in the access to corresponding data. Authentication in data transmissions or in data access is also included in the term "security" as it is used in the context of the present description. A module of a device or of a component can be configured here as a hardware unit and/or functional unit which can be designed on the basis of software and/or firmware. The function can be performed, for example, by means of a processor and/or a memory unit for storing program commands.

Industrial devices, e.g. control devices, field devices, IoT devices or IoT gateways, use a plurality of cryptographic keys, e.g. to authenticate themselves, to protect the integrity of stored data and program code, to check and decrypt firmware updates and to protect the integrity and, if necessary, the confidentiality of project planning data and configuration data. In order to transmit data, above all control data, said devices can be equipped with a data interface which can be designed and configured as wired or wireless, e.g. a WLAN, Bluetooth or NFC (Near Field Communication) interface. The device can be connected to a network or can communicate with other devices by means of this data interface.

Further wireless or radio-based transmission technologies are usable here (e.g. Safety over WLAN, such as e.g. ProfiSafe, WiMax, Cloud Robotics, GSM, UMTS, LTE, 5G, Vehicle-2-X communication, etc.).

In a "machine economy", which will come into use, in particular, in the Industry 4.0 environment, services are offered to autonomous units (entities), wherein the conditions and the agreement relating to a service can be negotiated and defined by smart contracts (intelligent consensus or intelligent consensus contract). Distributed databases exist. A common, binding business logic which can comprise the negotiated and binding conditions between the units or the agreement of said units can be distributed and/or centrally stored for the units using the distributed database. A time period within which the conditions are valid or to which the agreement applies can be understood as "binding". In the present context, the term "business logic" does not mean a purely commercial consensus between the units, but rather that one or more agreements, preferably relating to at least one specified technical requirement or prerequisite or condition—e.g. resource requirement or technical components to be provided or compliance with technical standards or use of specific protocols—is/are demanded by the business logic from the units involved. This/these agreement (s) are intended to be designed as non-manipulatable. A particular type of distributed database or distributed ledger is organized on the basis of a blockchain technology. Smart contracts of this type can implement conditions or agreements locally in the units involved therein.

A blockchain is generally understood to mean a distributed database whose integrity (safeguarding against subsequent manipulation) is protected through storage of the one-way function value, also referred to as the hash value, of the preceding dataset or block or element in the respective subsequent dataset or block or element, i.e. through cryptographic chaining. The protection arises through a plurality of trusted nodes in a blockchain network which carry out a mining or validation of blocks. In the network of nodes participating in a blockchain, a new block is formed at regular intervals, for example every 10 minutes, and the hash value of an existing block is stored along with it. once they have appeared in the chain, transactions are no longer modifiable unnoticed. An "oracle" can be used to introduce adapted/modified data from other sources into a smart contract, resulting in a specific behavior of a smart contract.

The sequence of all transactions stored in the blockchain can be referred to as the "general ledger" of the blockchain. One type of blockchain is an out-of-band blockchain or a hybrid in which some of the blockchain nodes communicate with one another in-band and some of the blockchain nodes communicate with one another out-of-band. Out-of-band communication is to be understood here to mean, in particular, a communication via a public network and/or communication via a network which differs from the aforementioned network.

Known blockchain systems are Bitcoin and Ethereum. Whereas Bitcoin was originally created for cryptocurrency transfers, Ethereum is based on the incorporation of smart contracts. The implementation of the contractual conditions or agreements is controlled via associated performed transactions: follow-up actions set out in a programmed smart contract can be carried out according to the performed transaction. Through the implementation of business logic in the form of smart contracts in a blockchain environment, the execution of the business logic instigated by a signed transaction is guaranteed as invariable or non-manipulatable.

One possible solution for securing the data exchange between two units or devices, particularly in the environment of an SDN controller, by means of a blockchain, has already been proposed in DE 102017217057.3.

Furthermore, a control device for operating a software-defined network having a number of network elements has already been proposed in EP 18173595.2, wherein, by means of a network image published in a general ledger of a blockchain, the network image can be compared with a network image of a further control device.

A controlled resource distribution in a distributed computer environment which relates only to computer resource distribution, but does not refer to any task completion of factory machines, is known from WO 2017/021155 A1.

If a consensus is reached between two autonomous units (e.g. two factory machines of two different manufacturers or companies), it is necessary for the communication infrastructure (IT) and runtime environment (OT) to be set up and configured so that the performance of the agreed transaction is effected and can be guaranteed in a timely manner. In the case of the aforementioned Bitcoin, a relatively simple stack-based runtime environment is used. A transaction comprises the checksum for checking the validity of the transaction. The aforementioned blockchain platform Ethereum supports a freely programmable runtime environment so that the program code of a blockchain can be implemented in a flexible manner. A business logic is stored here, for example, as program code in the blockchain. In this sense, the transaction to be performed is stored as a transaction dataset in a (chain) link of the blockchain. Further blockchain implementations, e.g. hyperledgers, are possible. A hyperledger supports a freely programmable runtime environment for the execution of smart contracts.

The aforementioned solutions provide purely structural environments for the execution of smart contracts. However, they do not cover the operational part and the execution itself. In most Industry 4.0 scenarios, the need exists to enable or perform a flexible resource allocation during the operation of the system or installation. An integrated solution for uniform and efficient resource allocation/distribution is necessary in respect of the cloud, edge cloud and/or industry edge cloud also.

SUMMARY

A need, then, exists for reliable communication in a wireless transmission of control data and additional data which are used for a control. It must be assumed here that the radio transmission can be subject to temporary interference or interruption. The teachings of the present disclosure include improved methods, devices, and/or facilities compared with the above-mentioned prior art, particularly in the environment of machine interactions.

For example, some embodiments include a control device (OM) for setting up and/or providing a working environment which comprises at least one performance unit (TM) to perform at least one factory task by means of machines, having: a resource management unit for requesting resources necessary for the working environment, a comparison unit which is configured to compare the requested resources with at least one resource agreed upon in a binding agreement stored in a distributed database and to approve the requested resource in dependence on the comparison result, wherein the control device is configured to set up and/or provide the working environment with at least one compared and approved resource, and the at least one performance unit is configured to coordinate the checking for complete factory task performance by one or more units involved in the working environment.

In some embodiments, the at least one performance unit is configured to perform the at least one task once the working environment has been set up and/or provided.

In some embodiments, the agreement is designed as a smart contract which is stored in one or more blockchains.

In some embodiments, the control device is configured to initiate an approval of said resources and/or to perform said approval itself.

In some embodiments, the at least one performance unit further has a monitoring unit which is configured to log the parameters necessary for the performance of the at least one task and, if necessary, store them in the blockchain.

As another example, some embodiments include a method for setting up and/or providing a working environment for the performance of at least one factory task by means of machines, having the following steps: requesting (2) resources necessary for the working environment, comparing the requested resources with at least one resource agreed upon in a binding agreement stored in a distributed database and approving the requested resource in dependence on the comparison result, and setting up and/or providing (3) the working environment with at least one compared and approved resource, wherein the checking (4) for correct and/or complete factory task performance by one or more machines involved in the working environment is coordinated.

In some embodiments, the at least one task is performed (4) once the working environment has been set up and/or provided.

In some embodiments, the agreement is designed as a smart contract which is stored in one or more blockchains.

In some embodiments, an approval (7) of said resources is initiated and/or performed.

In some embodiments, the parameters necessary for the performance of the at least one task or logged and, if necessary, stored in the blockchain.

In some embodiments, a billing (8) of the approved resources is performed once the working environment has been set up and/or provided.

As another example, some embodiments include a computer program product which initiates the performance of the method as described herein on a program-controlled device, in particular the control device as described herein.

BRIEF DESCRIPTION OF THE DRAWINGS

The properties, features, and advantages of the teachings of the present disclosure described above and the manner in which they are achieved will become clearer and more readily understandable in conjunction with the following description of the example embodiments which are explained in detail with reference to the figures. In the figures, in a schematic view.

DETAILED DESCRIPTION

Figure 1:
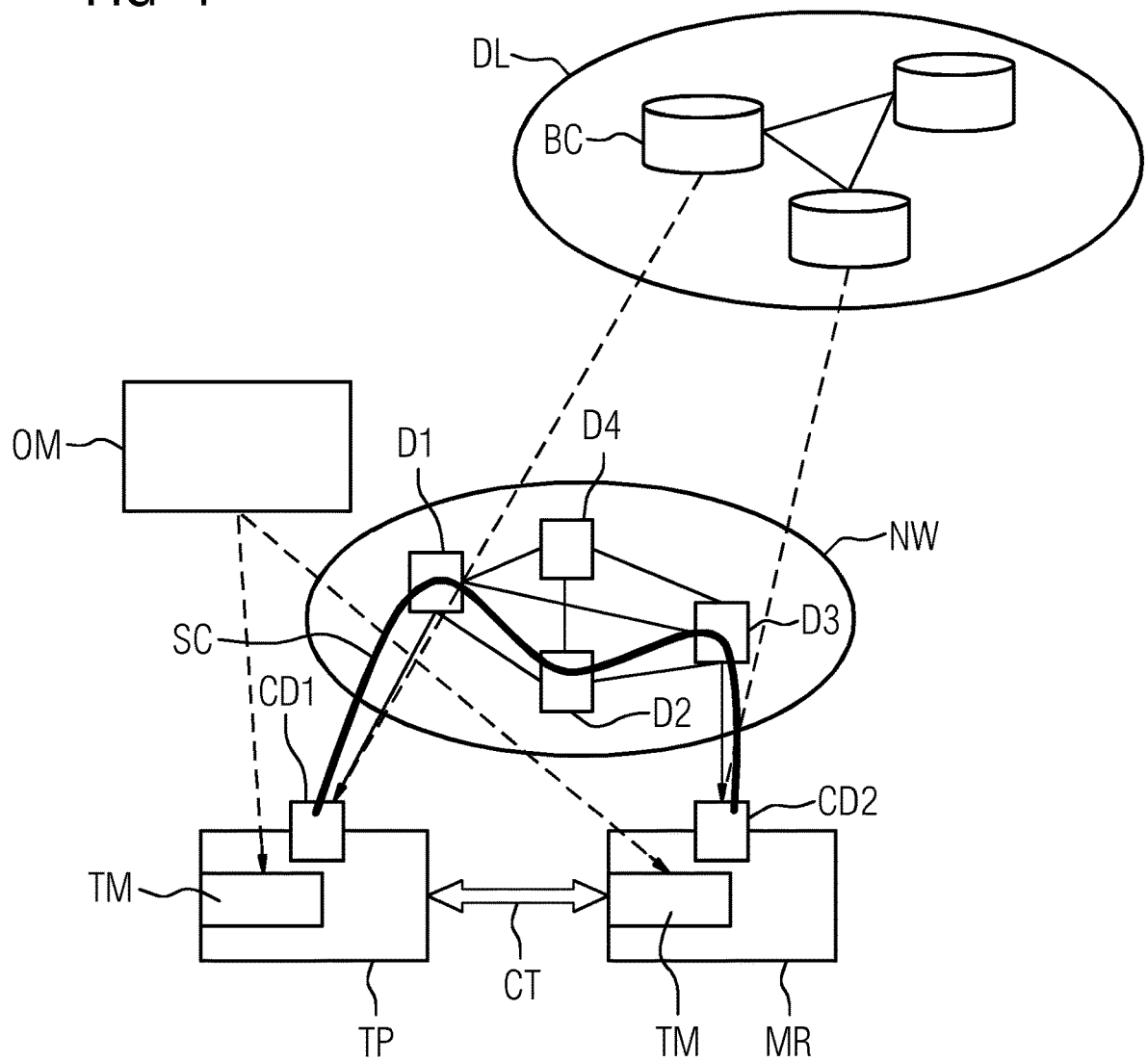
FIG. 1 shows schematically a machine economy environment incorporating teachings of the present disclosure.

The present disclosure describes control devices for setting up and/or providing a working environment. For example, some embodiments of the teachings herein comprise at least one performance unit to perform at least one task, having:

a resource management unit for requesting resources necessary for the working environment, and a comparison unit which is configured to compare the requested resources with at least one resource agreed upon in a binding agreement stored in a distributed database and to approve the requested resource in dependence on the comparison result, wherein the control device is configured to set up and/or provide the working environment with at least one compared and approved resource.

In some embodiments, the distributed database is organized as a blockchain. One or more agreements of this type can be designed or formed as a smart contract of at least one blockchain. The working environment can be a virtual working environment, i.e. it is only "logically" or functionally simulated in its mode of operation corresponding to a physical working environment. It is conceivable for a plurality of blockchain structures to exist for one overall agreement between the aforementioned units. Said overall agreement is then organized into a plurality of smart contracts or complementary versions of one smart contract in order to reach or form a consensus. The performance unit can be configured to perform the at least one task once the working environment has been set up and/or provided.

In the context of the present disclosure, the term "provision" can mean, for example, a set-up, loading and/or storage of the working environment by a data medium or platform. The set-up, loading and/or storage are normally effected by one or more computer program software or firmware packages. The performance unit can further be configured to coordinate the checking for complete task performance by one or more units involved in the working environment. The final status for complete performance of the task can then be defined in a smart contract. This final status can then be forwarded to other units.

The control device can be configured to initiate an approval of said resources and/or to perform said approval itself.

The performance unit can further have a monitoring unit which is configured to log the parameters necessary for the performance of the at least one task and, if necessary, store said parameters in the blockchain or in a plurality of blockchains. The monitoring unit or monitoring component, configured, for example, as part of support services for the (factory) task performance which can be or is integrated into the execution infrastructure in order to monitor different parameters and store them in the blockchain. This can be used, for example, for a subsequent billing or input parameters for further smart contract negotiations or agreements, but can also instigate other smart contracts during the task performance (as a side effect).

In some embodiments, one or more infrastructure suppliers for the execution environment can incorporate further units into the negotiation of the smart contract for the task performance. The agreement then includes not only offers and the use of a service (for example a manufacturing step), but also the supply of the performance unit or an execution infrastructure correspondingly including its functionality. The participation of the infrastructure suppliers in the contract negotiation then also comprises the resource distribution for a jointly shared or used infrastructure which is then part of a consensus mechanism.

In some embodiments, there is a method for setting up and/or providing a working environment for the performance of at least one task, having the following steps:

requesting resources necessary for the working environment, and comparing the requested resources with at least one resource agreed upon in a binding agreement stored in a distributed database and approving the requested resource in dependence on the comparison result, wherein setting up and/or providing the working environment with at least one compared and approved resource.

Once the working environment has been set up and/or provided, a billing of the approved resources can be carried out. This can be carried out in dependence on the device/system structure and the business model. Various embodiments of the teachings herein offer the following advantages:

man-machine or machine-machine interactions are enabled by the physical and/or virtual infrastructure by means of an agreement.

(virtual) working environments are set up and supplied during the runtime of the system or installation, wherein the agreements are automatically kept and locally organized, and are defined by agreement (s).

resource allocation is guaranteed and protected in a secure manner, wherein a billing of the allocated resources is optionally possible.

In some embodiments, there is a computer program (product) comprising program code which can be executed by at least one processor and which causes the at least one processor to implement the methods described herein. The computer program can run or initiate the performance of a method on a program-controlled device or facility of the aforementioned type, or can be stored as a computer program product on a computer-readable medium.

In addition, one variant of the computer program (product) having program commands for configuring a creation device can be, for example, a 3D printer, a computer system or a production machine suitable for creating processors and/or devices. The method and computer program (products) can be designed according to the developments/embodiments of said facility or device and their developments/embodiments.

In some embodiments, there is a dynamic and on-demand set-up of an execution infrastructure performing a trusted and agreed task, e.g. denoted in FIG. 1 by CT (cooperation task) for smart contracts SC, said execution infrastructure being implemented by means of a blockchain technology in a machine economy environment. Independent units (i.e. different manufacturers or suppliers), for example factory machines or devices D1 to D4, autonomously or semi-autonomously offer and use services between one another, and negotiate, fulfil and document agreements/contracts by means of a distributed ledger DL which is characterized by a blockchain technology. FIG. 1 shows, by way of example, a machine economy environment of this type. Blockchain nodes BC are indicated in the distributed ledger. Here, the machines are, for example, an autonomous transport facility TP which comprises a task management module TM and is connected to or equipped with a mobile communication device CD1. A further machine is, for example, a mobile robot MR which also has a task management module TM and a communication device CD2.

In order to be able to perform the cooperation task which is controlled by an order management OM, the communication via the network NW between the two machines TP and MR must be secured and furthermore optimally protected. For this purpose, a communication path SC or a virtual communication connection (virtual network, e.g. VLAN or SDN, possibly also VPN) is set up according to the conditions of the smart contract. Finally, resources must be requested for the machines, said resources enabling a working environment to be set up and guaranteeing the performance of the cooperation task which can comprise one or more production tasks or steps. The communication path is secured against manipulation or attacks by means of the previously negotiated conditions in the smart contract and the thus correspondingly defined structure of the (virtual) communication network. The resources are provided by a support service which can supply, for example, the device D1 or a cloud (not shown). The order management OM controlling the set-up of the working environment, the units TP and the via the communication path SC with the devices D1, D2, D3 of the network can be involved here in the example as the above-mentioned working environment, wherein the resource allocation, e.g. SC, TM, CD1, CD2, D1, D2, D3 for this working environment is performed following achievement or fulfilment of the smart contract condition (s) which is/are stored in the distributed ledger DL.

Figure 2:
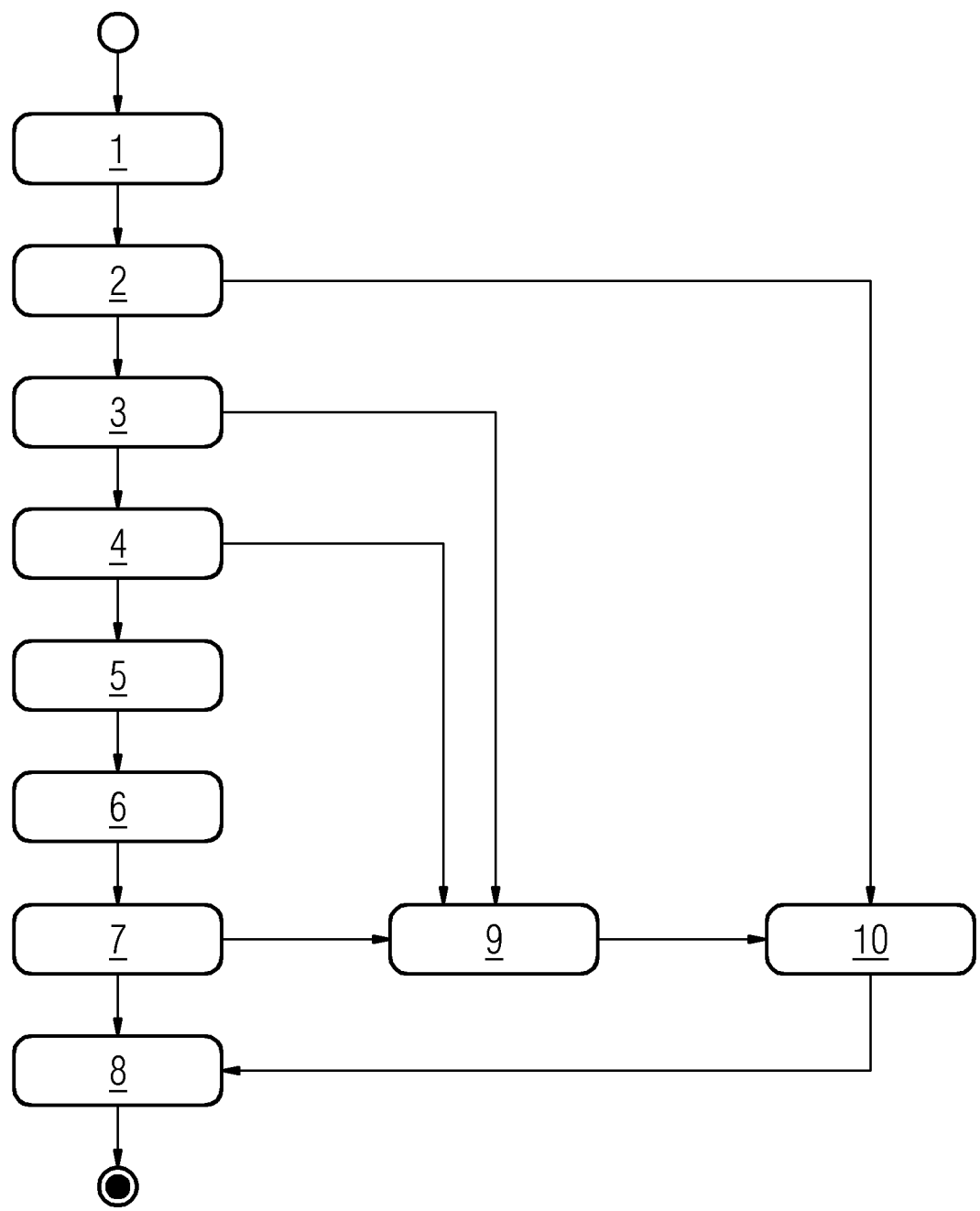
FIG. 2 shows a sequence of an example for setting up a working environment incorporating teachings of the present disclosure.

In some embodiments, a computer-supported method sets up a working environment or working infrastructure as soon as the agreement or the condition resulting from the smart contracts is fulfilled. According to FIG. 2, the following steps denoted by numbers 1 to 10 are carried out:

Denoted by 1: making an agreement: participating machines make an agreement which can be designed as a smart contract which is stored in a blockchain. This agreement comprises parameters and required service level agreements for an infrastructure in live operation. An agreement could be, for example: machine 1, in FIG. 1 for example MR, manufactured by supplier A, supports or supplies a task B, in FIG. 1 for example CT, for machine 2, in FIG. 1 for example TP, manufactured by supplier C, for a price D in a time window E with requirements X (e.g. machine ID), Y (e.g. communication service request), Z (e.g. resource request), in FIG. 2, in step 2, for example Z is requested, for the execution infrastructure or working environment.

Denoted by 2: resource request: the smart contract contains infrastructure requests for incorporating infrastructure manufacturers or suppliers. A request of this type is signed by means of a smart contract and comprises, for example, the machine identification (ID), machine signatures, communication service requirements and requirements for a virtual working environment (virtual workspace), such as resources involved in the form of physical or virtual units for storage, processing or communication or communication connection. Communication service requirements, such as bandwidth, delay, jitter or specific protocol requirements (for example Profinet IRT) can be defined as an end-to-end connection or by means of a simple (virtual) connection. If an infrastructure supplier cannot confirm and/or meet a requirement, the smart contract is notified, as a result of which the business logic is executed in order to search for an alternative supplier. Every resource which is available in the resource pool notifies the service of its offering and also the components which can be offered for the virtual working environment. This possibly also comprises requirements for the virtual working environment. If the resource provider cannot meet the requirement, the smart contract is notified.

Denoted by 3: setting up or forming or configuring a working environment: the working environment is constructed by means of software. It can also comprise hardware infrastructure and contain a communication connection to remote cloud elements. Participating infrastructure suppliers allocate resources, set up the virtual working environment and build a virtual network according to the guaranteed resource allocations which are based on the signatures provided by the smart contract. The virtual working environment with its virtual network layers allows an exclusive communication between the parties to the contract according to the specification and/or conditions in the contract. The set-up of the virtual working environment is performed during the runtime of the system, including the virtualized execution environment. If necessary, containers, virtual network functions within a virtual client network, for example client-specific access control or traffic adaptation and virtual network functions, are used at system level. The set-up of the virtual working environment is performed by the system owner, wherein clients or participants in the client network are free within the working environment to use the allocated resources according to the contract without further interventions/configurations of the system owner. If necessary, the set-up process uses the infrastructure which is made available by the distributed ledger. This can be the unmodifiable data memory in the distributed ledger, for example for subsequent audits or cryptography elements such as public/private key infrastructure, in order to identify or authenticate devices or to sign performed transactions or their steps.

Denoted by 4: factory task, e.g. cooperation task specified in FIG. 1, which can comprise a production process: all machines involved use the allocated resources and perform their factory tasks or production tasks.

Denoted by 5: check for correct and/or complete performance of the factory task: once the factory task is completed, check all machines involved for complete correct performance of the task and fulfilment of the agreement/contract by the smart contract.

Denoted by 6: forwarding of the final status: the smart contract contains the final status in order to prompt the participating infrastructure suppliers to release resources.

Denoted by 7: resource approval: following notification that the task has been successfully completed, said notification having been received by the smart contract, the participating infrastructure suppliers approve resources, i.e. the virtual infrastructure and the shutdown of all units which form part of the virtual working environment. Finally, the resource usage, including its signatures, is reported to the smart contract.

Denoted by 8: billing: this can be carried out in dependence on the system structure and the business model.

Denoted by 9: Support services: Support services deliver functionalities, such as monitoring infrastructure usage, measuring resource usage, receiving and handling necessary information (for example data usage or alarms) from the infrastructure, maintaining the infrastructure configuration and use. Support functions can generate alarms and trigger events (for example in the event that the infrastructure fails or parties to the contract violate the agreement) and transmit this to the distributed ledger.

Denoted by 10: distributed ledger: distributed ledger DL (for example implemented as a blockchain) delivers the functionality for storing data and a business logic (for example smart contract) which is unmodifiable in a local manner for different independent participating units or parties. These independent units can reach a consensus by means of the smart contract, thereby implying trust or security. Any data can thus be stored and agreements can be made which are relevant to the execution of on-demand business relationships between different parties involved, for example agreed requirements for the execution infrastructure, performance of measures and billing information).

In some embodiments, there is a monitoring unit or monitoring component (as part of the support services) for the factory task performance which is integrated into the execution infrastructure in order to monitor different parameters and store them in the distributed ledger. This can be used, for example, for a subsequent billing or input parameters for further smart contract negotiations or agreements but can also trigger other smart contracts during the task performance (as a side effect).

Although the teachings herein have been illustrated and described in greater detail by means of the example embodiment, the scope of the disclosure is not limited by the disclosed examples and other variations may be derived therefrom by the person skilled in the art without departing from the protective scope thereof.

The processes or method sequences described above can be implemented by means of infrastructures which are present on computer-readable storage media or in volatile computer memories (collectively referred to below as computer-readable memories). Computer-readable memories are, for example, volatile memories such as caches, buffer memories or RAMs, as well as non-volatile memories such as removable storage devices, hard disks, etc.

Functions or steps described above can be present in the form of at least one set of instructions in/on a computer-readable memory. The functions or steps are not tied to a specific set of instructions or to a specific form of sets of instructions or to a specific storage medium or to a specific processor or to specific execution schemes, and can be executed by software, firmware, microcode, hardware, processors, integrated circuits, etc., operating in isolation or in any combination. A broad range of processing strategies can be deployed, for example serial processing by means of a single processor or multiprocessing or multitasking or parallel processing, etc.

The instructions can be stored in local memories, but it is also possible to store the instructions on a remote system and access them via a network.

The term "processor", "central signal processing", "control unit" or "data evaluation means", as used here, comprises processing means in the broadest sense, i.e., for example, servers, universal processors, graphical processors, digital signal processors, application-specific integrated circuits (ASICs), programmable logic circuits such as FPGAs, discrete analog or digital circuits and any combinations thereof, including all other processing means known to the person skilled in the art or developed in future. Processors can consist of one or more devices or facilities or units. If a processor consists of a plurality of devices, said devices can be designed or configured for parallel or sequential processing or execution of instructions.

What is claimed is:

1. A control device for providing a working environment which comprises at least one machine to perform at least one factory task of machines, the device comprising:
    a non-transitory memory storing a set of instructions; and
    one or more processors in communication with the memory, the one or more processors programmed to access the set of instructions from the memory;
    wherein the set of instructions, when executed by the one or more processors, cause the one or more processors to:
        request resources necessary for the working environment, the resources comprising storage, processing, or communication devices; and
        compare the requested resources with at least one resource agreed upon in a binding agreement stored in a distributed database and to approve the requested resource in dependence on the comparison result, wherein the binding agreement includes a machine identification, machine signatures, communication service requirements, and requirements for a virtual working environment;
        provide the working environment with at least one compared and approved resource; and
        coordinate checking for complete factory task performance by the at least one machine involved in the working environment;
    wherein providing the working environment with at least one compared and approved resource includes enabling communication between the at least one compared and approved resource and a storage resource supplying data associated with performance of the factory task.

2. The control device as claimed in claim 1, wherein the at least one machine is programmed to perform the at least one task once the working environment has been set up and/or provided.

3. The control device as claimed in claim 1, wherein the agreement comprises a smart contract stored in one or more blockchains.

4. The control device as claimed in claim 1, wherein the set of instructions further includes instructions to initiate an approval of said resources and/or to perform said approval.

5. The control device as claimed in claim 1, wherein the at least one machine further comprises a monitor programmed to log parameters necessary for the performance of the at least one task and, if necessary, store them in the blockchain.

6. A method for setting up and/or providing a working environment for the performance of at least one factory task by machines, the method comprising:
    requesting resources necessary for the working environment, the resources including storage, processing, and/or communication devices;
    comparing the requested resources with at least one resource agreed upon in a binding agreement stored in a distributed database and approving the requested resource in dependence on the comparison result, wherein the binding agreement includes a machine identification, machine signatures, communication service requirements, and requirements for a virtual working environment; and
    setting up and/or providing the working environment with at least one compared and approved resource, wherein one or more machines automatically performs the at least one factory task once the resource has been set up and/or provided; and
    coordinating checking for correct and/or complete factory task performance by the one or more machines
    wherein providing the working environment with at least one compared and approved resource includes enabling communication between the at least one compared and approved resource and a storage resource supplying data associated with performance of the factory task.

7. The method as claimed in claim 6, wherein the agreement comprises a smart contract stored in one or more blockchains.

8. The method as claimed in claim 6, further comprising initiating or performing an approval of said resources.

9. The method as claimed in claim 6, wherein the parameters necessary for performance of the at least one task are logged and, if necessary, stored in the blockchain.

10. The method as claimed in claim 6, further comprising billing the approved resources once the working environment has been set up and/or provided.

* * * * *